US006432556B1

(12) United States Patent
Brauer et al.

(10) Patent No.: US 6,432,556 B1
(45) Date of Patent: Aug. 13, 2002

(54) COPPER ALLOY WITH A GOLDEN VISUAL APPEARANCE

(75) Inventors: Dennis R. Brauer, Brighton; Eugene Shapiro, Glen Carbon, both of IL (US); Kip D. Klein, St. Louis, MO (US); John C. Yarwood, Edwardsville, IL (US); John F. Breedis, Trumbull, CT (US)

(73) Assignee: Olin Corporation, East Alton, IL (US)

( * ) Notice: Subject to any disclaimer, the term of this patent is extended or adjusted under 35 U.S.C. 154(b) by 0 days.

(21) Appl. No.: 09/561,110

(22) Filed: Apr. 28, 2000

Related U.S. Application Data

(60) Provisional application No. 60/132,548, filed on May 5, 1999, and provisional application No. 60/168,024, filed on Nov. 30, 1999.

(51) Int. Cl.[7] .............................. B32B 15/20; C22C 9/04
(52) U.S. Cl. ........................ 428/579; 428/675; 428/931; 420/481; 420/482; 40/27.5
(58) Field of Search .................. 428/675, 579, 428/686, 931, 925; 420/481, 482; 40/27.5

(56) References Cited

U.S. PATENT DOCUMENTS

| 824,103 | A |  | 6/1906 | Driver |
|---|---|---|---|---|
| 981,542 | A |  | 1/1911 | Driver |
| 1,947,065 | A |  | 2/1934 | Scott |
| 1,983,205 | A |  | 12/1934 | Wilkins |
| 2,445,868 | A |  | 7/1948 | Berwick |
| 2,772,962 | A | * | 12/1956 | Reichenecker ............. 75/157.5 |
| 3,141,799 | A |  | 7/1964 | Brellier |

(List continued on next page.)

FOREIGN PATENT DOCUMENTS

| DE | 198 02 246 C1 | 7/1999 | ............. C22C/9/04 |
|---|---|---|---|
| FR | 967018 | 10/1950 | |
| GB | 868276 | 5/1961 | |
| JP | 54-132424 | 10/1979 | ............. C22C/9/04 |
| JP | 55-79849 | * 6/1980 | |
| JP | 06-240389 | * 6/1997 | |
| JP | 101 21168 | 5/1998 | |
| JP | 10-298678 | * 11/1998 | |

OTHER PUBLICATIONS

Edited by J.R. Davis, "Metals Handbook" Desk Edition, *ASM International*, 1998, pps 1275–1281. (No Month).
Nancy E. Kelly, "Mint's new $1 coins will use 1.8M lbs. of metal", *American Metal Market*, Oct. 6, 1999, p. 16.
ASM International Handbook Committee, "Metals Handbook", Tenth Edition, *ASM International*, Oct. 1990, p. 234.
Lahiri, et al, "Studies on properties of some ternary copper alloys of the Cu–Mn–Zn and Cu–Mn–Ni system", *Transactions of The Indian Institute of Metals*, Sep. 1966, pp. 141–146.
Dean, R.S., et al., "The Alpha Solid Solution Field of the Copper–manganese–zinc System", U.S. Dept. of the Interior, in *Metals Technology*, Jun. 1945, pp. 232–243.
HunterLab pamphlet, Hunter Associates Laboratory, Inc., Reston, VA 20190–5280, www.hunterlab.com, 20 pages.
U.S. Provisional patent application Ser. No. 60/132,548, "Clad Coin with a Golden Color," by Brauer et al. filed 05/99.
U.S. Provisional patent application Ser. No. 60/168,024, "Copper Alloy with a Golden Visual Appearance," by Brauer et al. filed 11/99.

*Primary Examiner*—John J. Zimmerman
(74) *Attorney, Agent, or Firm*—Gregory S. Rosenblatt; Wiggin & Dana

(57) ABSTRACT

There is provided a copper-base alloy useful for coinage that has a golden visual appearance. The material has a transverse electrical conductivity substantially similar to that of copper alloy C713 and when clad to a copper alloy C110 core, a transverse electrical conductivity substantially similar to both sides of a Susan B. Anthony United States dollar coin. The copper-base alloy is a copper-manganese-zinc-nickel alloy.

23 Claims, 5 Drawing Sheets

U.S. PATENT DOCUMENTS

| | | |
|---|---|---|
| 3,234,014 A | 2/1966 | McLain et al. |
| 3,880,678 A | 4/1975 | Shapiro et al. |
| 4,003,715 A * | 1/1977 | Cascone ................. 29/182.3 |
| 4,049,434 A * | 9/1977 | Sloboda et al. ........... 75/134 C |
| 4,169,729 A | 10/1979 | Popplewell et al. |
| 4,171,972 A | 10/1979 | Bates et al. |
| 4,202,708 A | 5/1980 | Bates et al. |
| 4,242,132 A | 12/1980 | Shapiro et al. |
| 4,330,599 A | 5/1982 | Winter et al. |
| 4,401,488 A | 8/1983 | Prinz et al. |
| 4,429,022 A * | 1/1984 | Breedis et al. .............. 428/675 |
| 4,525,434 A | 6/1985 | Morikawa et al. |
| 4,631,171 A * | 12/1986 | McDonald et al. ......... 420/481 |
| 4,632,806 A | 12/1986 | Morikawa et al. |
| 4,676,848 A | 6/1987 | Ruchel et al. |
| 5,246,509 A | 9/1993 | Kato et al. |
| 5,441,696 A | 8/1995 | Kubosono et al. |
| 5,472,796 A | 12/1995 | Breedis et al. |
| 5,583,642 A | 12/1996 | Nakazono |
| 5,668,633 A | 9/1997 | Cheetam et al. |
| 5,740,079 A | 4/1998 | Shigemori et al. |
| 5,779,058 A | 7/1998 | Satake et al. |
| 5,841,421 A | 11/1998 | Cheetam et al. |
| 5,885,376 A | 3/1999 | Suzuki et al. |
| 5,929,998 A | 7/1999 | Kettler et al. |

\* cited by examiner $$\Delta E_{CMC}=[(\frac{\Delta L^*}{lSL})^2+(\frac{\Delta C^*}{cSC})^2+(\frac{\Delta H^*}{SH})^2]^{1/2}$$

COPPER ALLOY WITH A GOLDEN VISUAL APPEARANCE

CROSS-REFERENCE TO RELATED PATENT APPLICATIONS

This patent application claims priority to U.S. Provisional Patent Applications Ser. No. 60/132,548 filed May 5, 1999 and Ser. No. 60/168,024 filed Nov. 30, 1999. The subject matter of both serial number 60/132,548 and 60/168,024 is incorporated by reference in its entirety herein.

BACKGROUND OF THE INVENTION

1. Field of the Invention

This invention relates to a copper-base alloy that has a golden visual appearance. More particularly, the copper base alloy is useful, as either a monolithic material or as a cladding layer, for the stamping of planchets used to mint coins.

2. Description of Related Art

The Susan B. Anthony United States one dollar coin (SBA) is a three-layer clad with a copper alloy C110 core and copper alloy C713 cladding layers bonded to opposing sides of the core. Copper alloy C110 has a nominal composition, by weight, of 99.95% copper and 0.04% oxygen and is commonly known as electrolytic tough pitch (ETP) copper. Copper alloy C713 has a composition, by weight, of 23.5%–26.5% nickel and the balance copper. Copper alloy C713 is commonly known as a cupronickel.

In the SBA, the ETP copper core constitutes about 50% of the coin's overall thickness and each of two cupronickel cladding layers constitutes about 25% of the overall thickness.

A significant problem with the SBA is that the coin has a silver/gray visual appearance that is similar to the color of the United States quarter. Since the SBA and the quarter, which has only 0.25 the face value of the SBA, are also similar in size and weight, it is not uncommon for the SBA to be mistaken for a quarter.

It is desirable for the United States to have a one dollar coin that is readily distinguished from the quarter. The United States Mint has suggested that a new one dollar coin have a golden visual appearance.

A number of gold-colored materials for coinage are known. U.S. Pat. No. 4,401,488 to Prinz, et al. discloses a copper base alloy containing, by weight, 4%–6% of nickel and 4%–6% of aluminum. "Copper base" is intended to convey that the alloy contains at least 50%, by weight, of the base material, copper.

U.S. Patent No. 4,330,599 to Winter, et al. discloses a copper base alloy containing, by weight, 2%–3.5% of aluminum and 1%–2.5% of silicon. A number of visually golden copper alloys are disclosed in U.S. Pat. No. 5,472,796 to Breedis, et al. The alloys disclosed in Pat. No. 5,472,796 include copper alloy C6155 having a nominal composition, by weight, of 92% copper, 6% aluminum and 2% nickel; the Swedish Crown having a nominal composition, by weight, of 89% copper, 5% aluminum, 5% zinc and 1% tin and the UK Pound having a nominal composition, by weight, of 70% copper, 24.5% zinc and 5.5% nickel.

U.S. Pat. Nos. 4,401,488; 4,330,599 and 5,472,796 are incorporated by reference in their entireties herein.

A second requirement of a new dollar coin is that the electrical signature be substantially identical to that of the SBA. Automatic coin discriminators, such as found in vending machines, utilize discriminators to determine the authenticity and face value of a coin. One type of automatic coin discriminator, referred to as an eddy current gauge, positions the coin adjacent to an electrical coil in which an alternating current is flowing. The alternating current, called the exciting current, causes eddy currents to flow in the coin. The magnitude and timing of the eddy currents is a function of the electrical conductivity of the coin. The SBA has an electrical conductivity in the transverse direction (from one major planar face to an opposing major planar face) of about 49% IACS when the exciting current is at a frequency of 60 kHz and about 6.6% IACS when the exciting current is at a frequency of 480 kHz.

IACS refers to "International Annealed Copper Standard" and assigns a conductivity value of 100% IACS to "pure" copper at 20° C.

U.S. Pat. No. 4,525,434 discloses copper alloys containing manganese, zinc, nickel and aluminum. Optional additions to the alloy include iron, cobalt and tin. The claimed alloy is disclosed as having good oxidation resistance and utility in clad leadframes. The highest recited electrical conductivity for a claimed alloy is 3.1% IACS. U.S. Pat. No. 4,525,434 is incorporated by reference in its entirety herein.

A third requirement of a new one dollar coin is tarnish resistance to enable the coin to maintain a golden appearance for an extended period of time, on the order of years.

It is not believed that any of the gold-colored clad materials presently available satisfy all three of the above requirements for coinage: golden visual appearance, an electrical signature similar to that of the SBA and tarnish resistance. Accordingly, there remains a need for such a material for coinage.

SUMMARY OF THE INVENTION

Accordingly, it is an object of the invention to provide a copper-base alloy having a golden visual appearance and useful for coinage. Further objects of the invention are that the copper-base alloy has an electrical signature similar to that of copper alloy C713 and suitable conductivity in excess of 4% IACS at eddy current gauge exciting frequencies of between 60kHz and 480kHz.

The above-stated objects, features and advantages will become more apparent from the specification and drawings that follow.

It is a feature of the invention that the copper-base alloy may effectively be utilized as a monolithic material or as a cladding layer. When utilized as a cladding layer, the core is formed from either copper or a copper base alloy having high electrical conductivity, typically in excess of 90% IACS. In a preferred embodiment of the invention, the core is formed from copper alloy C110.

Yet another feature of the invention is that the copper-base alloy has a golden visual appearance and an electrical conductivity on the order of 5%–7% IACS. Yet another feature of the invention is that the copper-base alloy contains manganese and zinc. In a preferred embodiment, between 2% and 6%, by weight, of nickel is added to the copper-base alloy to improve tarnish resistance.

It is another feature of the invention that when a clad is formed, the core constitutes about 50% of the overall thickness of the clad material and that each cladding layer constitutes about 25% of the overall thickness.

Among the advantages of the invention are that the copper-base alloy has a golden visual appearance and is suitable as a planchet for the minting of coins in either a monolithic format or as a cladding layer. It is another advantage of the invention that the electrical signature of the clad material is similar to that of the SBA when measured with an eddy current gauge at frequencies between at least 60 kHz and 480 kHz. This advantage enables continued use of electronic coin discriminators now in service to identify the SBA.

In accordance with the invention, there is provided a copper alloy that consists essentially, by weight, of from 5% to 10% of manganese, from 10% to 14% of zinc, from 2% to 6% of nickel, and the balance copper and inevitable impurities. The copper alloy has an electrical

DETAILED DESCRIPTION

Figure 1:
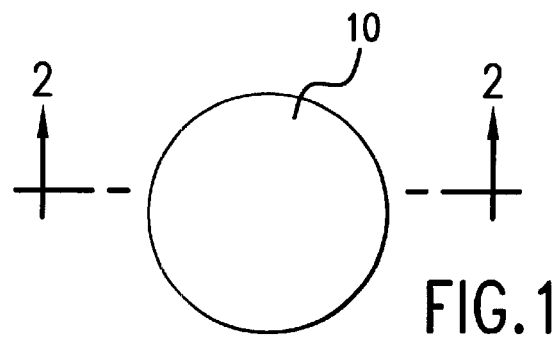
FIG. 1 illustrates in bottom planar view a planchet formed from the clad material of the invention.

FIG. 1 illustrates in bottom planar view a clad planchet 10. The planchet is a coin blank that is subsequently coined to impress desired features into the front and back surfaces. The diameter of the planchet coined into the SBA is about 26.92 millimeters (1.06 inches) prior to rimming and about 26.42 mm (1.04 inches) after rimming and has a nominal thickness of 1.65 mm (0.065 inch).

Color determination may be by spectroscopy or other objective means. Instruments, such as provided by Hunter Associates Laboratory, Inc. of Reston, Va., quantify color according to a lightness attribute commonly referred to as "value" and two chromatic attributes commonly referred to as "hue" and "chroma."

Hue is color perception, the recognition of an object as green, blue, red, yellow, etc. Chroma is color concentration and ranges from grey to pure hue. Value is the lightness of the color and ranges from white to black.

Figure 2:
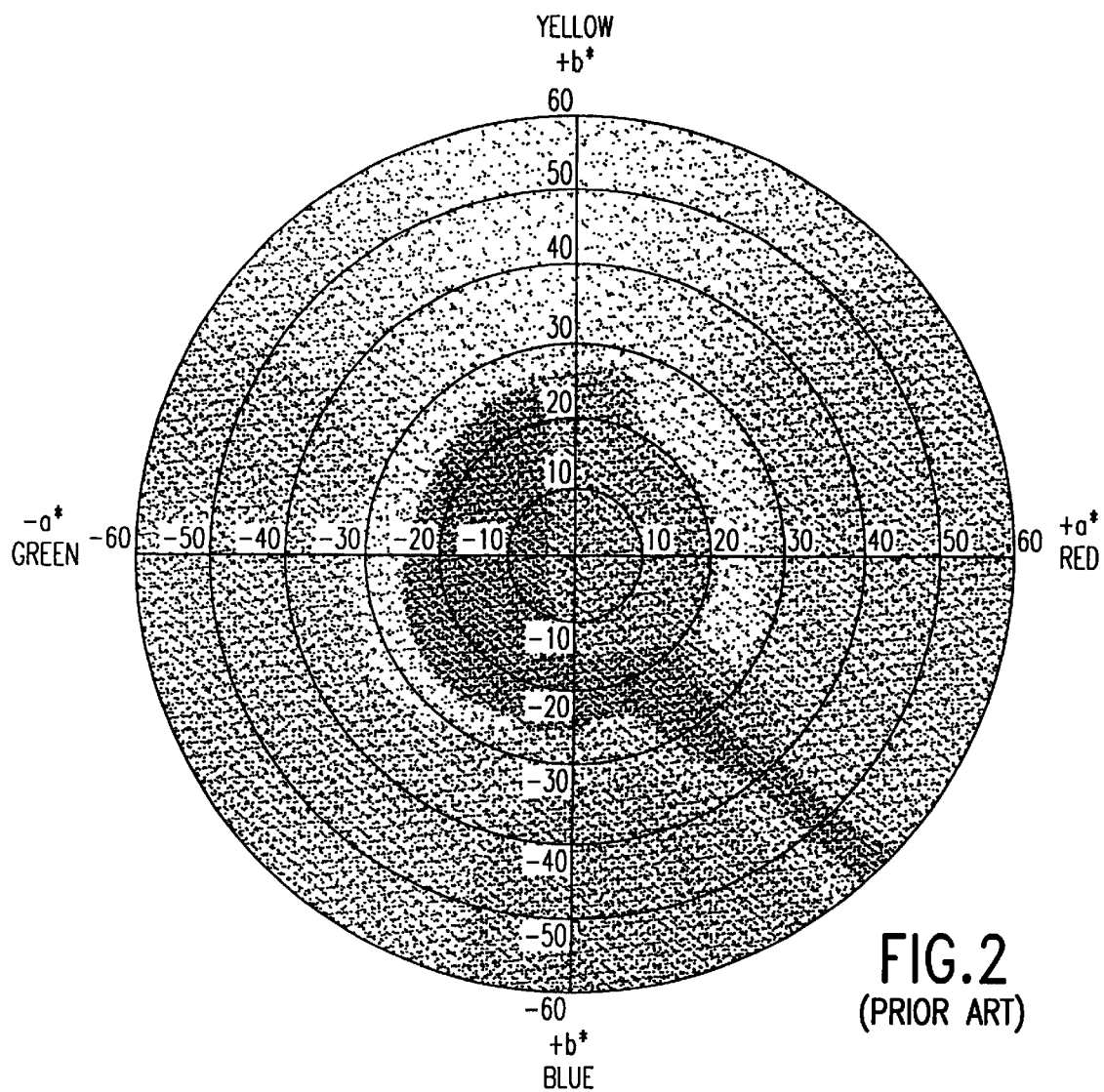
FIG. 2 graphically illustrates the 2-dimensional CIELAB color chart for chroma and hue as known from the prior art.
Figure 3:
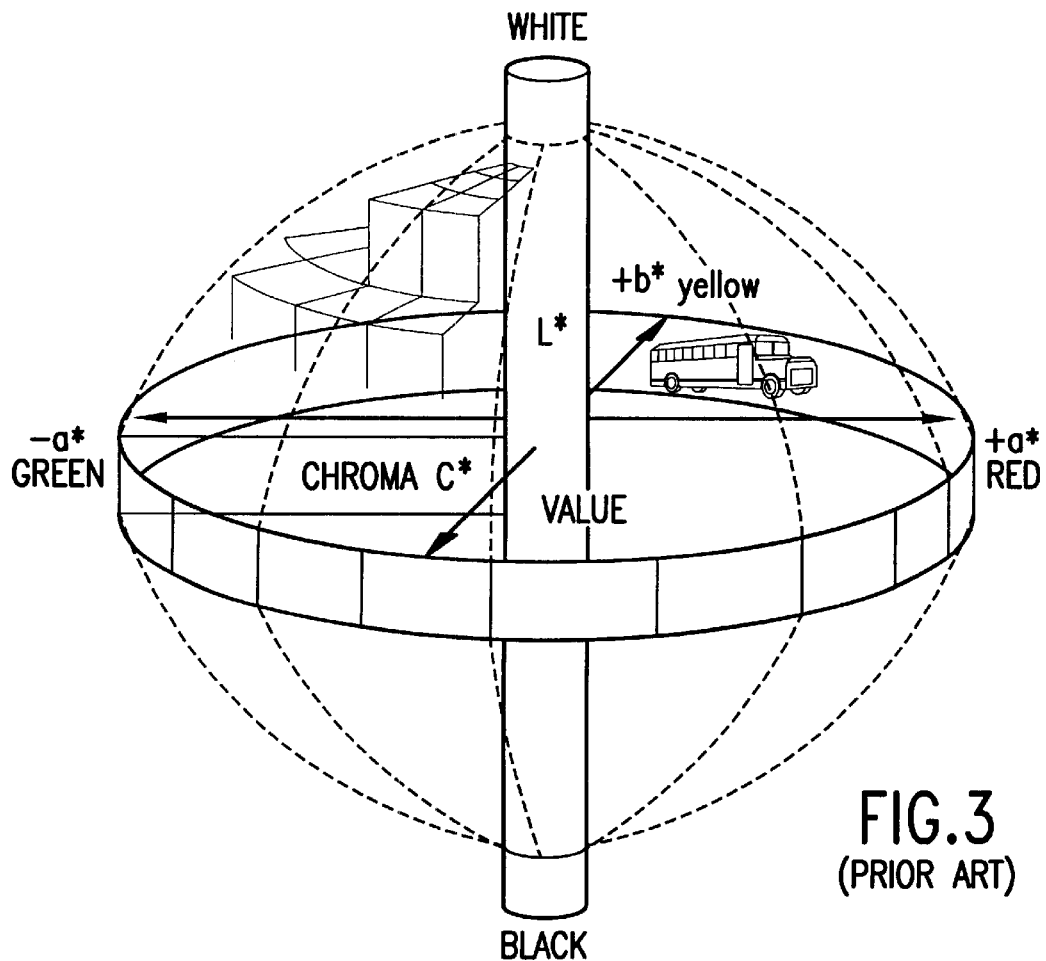
FIG. 3 graphically illustrates the 3-dimensional solid LAB color sphere for chroma, hue and lightness as known from the prior art.

One method of specifying color is by a CIELAB scale. CIE stands for Commission Internationale de l' Eclairage (International Commission on Illumination) and LAB stands for the Hunter L,a,b scale. As illustrated in FIG. 2, the CIELAB color chart expresses hue as a combination of an a* value and a b* value extending arcuately about the color chart, with +a* being red, -a* being green, +b* being yellow and -b* being blue. Chroma is expressed as a value from the center of the circle with the center (0) being grey and ±60 being full richness of the specified color. With reference also to FIG. 3, value is expressed as an L* number ranging from white to black such that the combination of hue, chroma and lightness represents a specific point on a three dimensional sphere and a specific color.

Alternatively, the color of the copper alloy is subjectively determined by comparison with gold and gold alloys.

A desired golden clad material has a color more similar to that of gold or a gold alloy down to 10 carat gold than to a gray or silver coin. 10 carat gold is essentially 41.7%, by weight, gold with the remainder a mixture of silver and copper.

Figure 4:
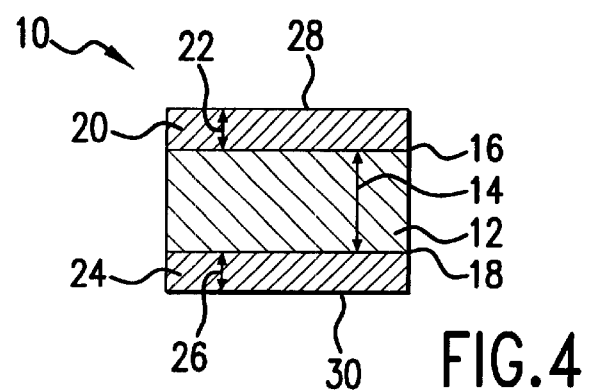
FIG. 4 illustrates the planchet of FIG. 1 in cross-sectional representation.

FIG. 4 illustrates the clad planchet 10 of FIG. 1 in cross-sectional representation. The clad planchet has a core 12 having a first thickness 14 that is defined by first 16 and second 18 opposing surfaces.

The core 12 is formed from either pure copper or a copper base alloy that has an electrical conductivity in excess of 90% IACS. "Base" is used in its normal way in the metallurgical arts and means the alloy has in excess of 50%, by weight, of the base metal, in this application, greater than 50%, by weight, of copper. Preferably, the core has an electrical conductivity of greater than 99% IACS and most preferably, the core is formed from copper alloy C110.

A first cladding layer 20 has a second thickness 22 and is bonded to the first opposing surface 16. Preferably, the bond is a metallurgical bond, such as cladding, where metallic atoms of the two layers are bonded together. Cladding is typically a result of co-rolling or explosive formation.

A second cladding layer 24 having a third thickness 26 is bonded to the second opposing surface 18. Again, the bond is preferably a metallurgical bond, such as a cladding.

Both the first cladding layer 20 and the second cladding layer 24 are copper base alloys that contain manganese and zinc in amounts effective to impart the cladding layers with a visually apparent golden color. One effective composition for the cladding layers is, by weight, 6%–12% manganese, 6%–25% zinc and the balance copper and inevitable impurities.

A more preferred composition for the cladding layers is, by weight, 7%–10% manganese, 10%–15% zinc and the balance copper and inevitable impurities. A most preferred nominal composition is, by weight, 8% manganese, 12% zinc and the balance copper.

To enhance tarnish resistance, both the first cladding layer and the second cladding layer may further contain up to 6%, by weight, of nickel and preferably contain between 2% and 6%, by weight, nickel, and most preferably from 3.5% to 4.5%, by weight, nickel. When nickel is present, the zinc content may be increased to maintain a golden visual appearance.

When nickel is present in the alloy, a suitable composition, by weight, is 10%–20% zinc, 2%–6% nickel, 3%–10% manganese and the balance copper. A preferred composition is, by weight, 10%–14% zinc, 2%–6% nickel, 5%–10% manganese and the balance copper and inevitable impurities. A more preferred composition is, by weight, 11%–12% zinc, 3.5%–4.5% nickel, 6.0%–7.0% manganese and the balance copper and inevitable impurities. A nominal most preferred composition is, by weight, 12% zinc, 4% nickel, 6.6% manganese and the balance copper.

On Oct. 6, 1999, *American Metal Market* published that the United States Mint had selected Applicants' alloy with a composition of 77%, by weight, copper, 12% zinc, 7% manganese and 4% nickel as the outer layers of a new United States one dollar clad coin.

For both the preceding cladding layer composition embodiments, the electrical conductivity of the cladding layer is in excess of 4% IACS when measured with an eddy current gauge at exciting frequencies of between 60kHz and 480kHz. More preferably, the electrical conductivity is between about 5% IACS and 7% IACS. Most preferably, each cladding layer has an electrical conductivity of between 5.1 % IACS and 6.1% IACS.

While the first cladding layer 20 and the second cladding layer 24 need not be of the same chemical composition, a similar composition is preferred and identical chemical compositions are most preferred to provide symmetry for the coin discriminator. Likewise, the second thickness 22 should be approximately equal to the third thickness 26. Preferably, the first thickness 14 constitutes from 40% to 60%, by thickness, of the overall thickness of the clad planchet and each of the first cladding layer 20 and second cladding layer 24 constitute between 20% and 30% of the overall thickness. By thickness, a preferred nominal composition is 25% first cladding layer, 50% core and 25% second cladding layer.

Additional alloying elements may be added to influence the properties of either the core or cladding layers. Suitable additives to the cladding layer include iron, chromium, aluminum, tin and phosphorous. These additives should be present in an amount less than that which deteriorates the golden visual appearance of the cladding layer and does not significantly change the electrical conductivity.

Preferably aluminum and/or tin are present in an amount of less than 0.5%, by weight, and preferably less than 0.1%, by weight and most preferably, less than 0.07%, by weight. Phosphorous is present in an amount of less than 1%, by weight, and more preferably less than 0.2%, by weight. Chromium is present in an amount less than 0.5%, by weight, and preferably less than 0.3%, by weight. Iron forms particles during annealing of the alloy. These particles interfere with the formation of equiaxed grains. The iron content should be maintained at less than 0.5%, by weight, and preferably is less than 0.2%, by weight.

After cladding, the transverse electrical conductivity (measured from first outer surface 28 to second outer surface 30) should about equal that of the SBA for eddy current gauge exciting current frequencies of between 60 kHz and 480 kHz. More preferably, the transverse electrical conductivity of the clad material is within 2% IACS and most preferably within 0.5% IACS at frequencies of between 60 kHz and 480 kHz. For some discriminators, the above electrical conductivity values should apply for exciting current frequencies of from 10 kHz to 600 kHz.

Figure 5:
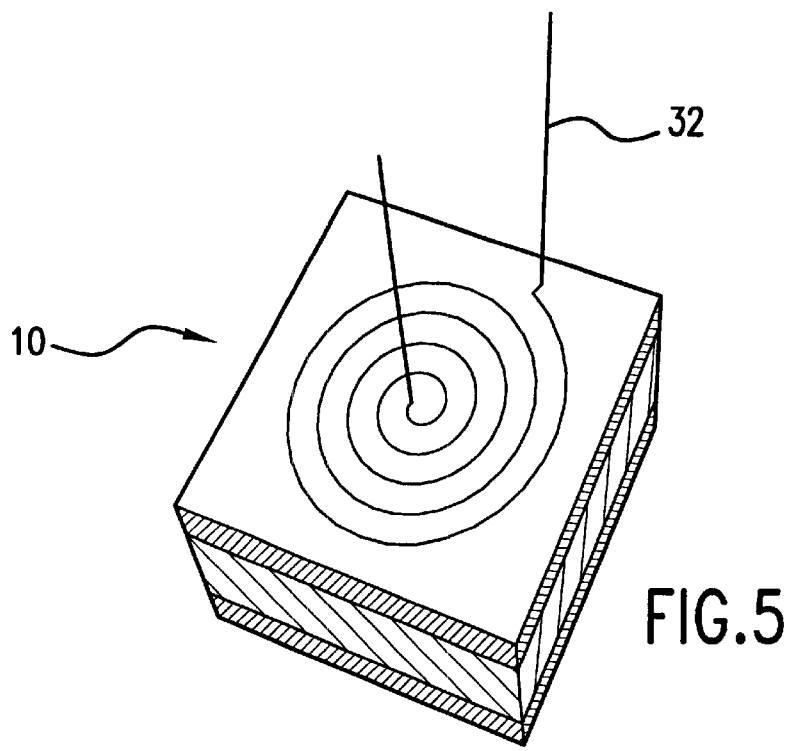
FIG. 5 illustrates use of an eddy current gauge to determine electrical conductivity.

With reference to FIG. 5, a clad material or planchet 10 is placed in proximity to an electric coil 32. Alternating current of a desired frequency is conducted through the coil 32 setting up an eddy current in the clad material 10. The transverse conductivity of the clad material influences the impedance of the coil 32. From coil 32 impedance, the electrical conductivity of the clad material may be determined. Any commercial eddy gauge measuring device may be utilized, such as a Sigmatest gauge manufactured by Foerster Instruments Inc. of Pittsburgh, Pa.

Once a planchet is stamped from the clad material, the planchet is annealed prior to coining. A suitable annealing profile is 700° C. for 15–20 minutes in an atmosphere of 96%, by volume, of nitrogen and 4%, by volume, of hydrogen or other combustible gas mixtures. Following annealing, a water quench may be utilized.

To minimize diffusion of the copper from the core into the first and second cladding layers, that likely could negatively impact the golden visual appearance, barrier layers (not shown) may be interposed between the first opposing surface 16 and the first cladding layer 20 as well as between the second opposing surface 18 and the second cladding layer 24. Such barrier layers may include ferromagnetic materials such as nickel, cobalt and iron, as well as alloys thereof, which influence the electrical and magnetic signature of the clad material. Non-ferromagnetic materials having less influence on the magnetic and electrical signature of the clad material include copper base alloys such as copper/ 20%–30%, by weight, nickel and copper/10%–20%, by weight, manganese alloys. When a barrier layer is utilized, the thickness of the core and the thickness of the cladding layers are adjusted to maintain the desired transverse electrical conductivity.

In the event that the planchet tarnishes during the anneal, one suitable brightening process utilizes a 35%, by volume, hydrogen peroxide aqueous solution that includes a proprietary additive designated MACBright 100, available from MacDermid, Waterbury, Conn. The cleaning is a two-step process.

The initial solution is prepared by using 30%, by volume, of the MACBright product made with deionized or distilled water. To this is added sulfuric acid in the range of 0–0.7% by volume. The planchet is degreased and introduced into the solution for 30–60 seconds with agitation at a temperature of between 38° C. and 43° C. (100° F. and 110° F.). The planchet is then water-rinsed and immersed for 20–30 seconds in 5 volume percent sulfuric acid at room temperature, given a thorough water rinse and then, optionally, coated with an anti-tarnish agent such as benzotriazole (BTA) and hot air dried.

Heat treating and chemical treating of the alloys of the invention may change the surface chemistry and influence the surface color without an appreciable change in the bulk properties of the alloy, such as electrical conductivity. For example, a heat treatment and/or chemical treatment may decrease the manganese content at the surfaces of the copper alloy.

The advantages of the clad coinage alloy of the invention will become more apparent from the examples that follow.

EXAMPLES

Example 1

Table 1 identifies the compositions of a number of copper-base alloys having a golden visual appearance that were direct chill cast, hot-rolled, cold rolled and annealed to a nominal thickness of 1.65 mm (0.065 inch). The transverse electrical conductivity of the copper-base alloys was measured using an eddy current gauge with exciting current frequencies as specified in Table 2. As recorded in Table 2, the transverse electrical conductivity of the copper-base alloys of the invention very closely follows that of the copper alloy C713.

TABLE 1

| | Composition in weight percent | | | | | |
|---|---|---|---|---|---|---|
| Alloy Code | Cu | Zn | Mn | Ni | P | Al | Sn |
| Y88 | Bal. | 11.9 | 7.8 | — | — | — | — |
| Y88 | Bal. | 12.4 | 7.7 | — | — | — | — |
| Y90 | Bal. | 12.0 | 6.9 | 3.6 | — | — | — |
| Y90 | Bal. | 12.2 | 7.0 | 3.7 | — | — | — |
| Y91 | Bal. | 11.7 | 7.3 | 1.9 | — | — | — |
| Y91 | Bal. | 12.6 | 7.2 | 2.3 | — | — | — |
| Y88(T1) | Bal. | 12.4 | 7.70 | — | — | — | — |
| 4 | Bal. | 12.1 | 6.92 | 3.76 | — | — | — |
| 5 | Bal. | 12.5 | 6.88 | 3.76 | 0.082 | — | — |
| 6 | Bal. | 15.7 | 6.99 | 3.29 | — | — | — |
| 7 | Bal. | 11.3 | 8.05 | — | 0.095 | — | — |
| 118 | Bal. | 30.3 | 6.46 | 2.6 | — | — | — |
| 119 | Bal. | 24.9 | 6.55 | 3 | — | — | — |
| 120 | Bal. | 19 | 6.76 | 3 | — | — | — |
| 121 | Bal. | 16 | 7.5 | 3 | — | — | — |
| 151 | Bal. | 12.8 | 6.90 | 1.0 | — | 1.5 | — |
| 152 | Bal. | 12.8 | 7.14 | 1.36 | — | — | 0.9 |

TABLE 2

| Annealed Sheet | Conductivity, %IACS at Freq. (kHz) | | | | |
|---|---|---|---|---|---|
|  | 60 | 120 | 240 | 480 | Kelvin Bridge |
| C713 | 5.2 | 5.6 | 5.5 | 5.4 | 5.4 |
| Y88 (T1) | — | 6.0 | — | — | 6.1 |
| Y88 (823923) | — | 6.0 | — | — | 6.2 |
| Y90 | 6.0 | 6.0 | 5.9 | 5.9 | 6.2 |
| Y91 | 5.9 | 6.0 | 5.8 | 5.8 | 6.2 |
| 4 | 5.9 | 5.9 | — | — | — |
| 5 | 5.7 | 5.6 | — | — | — |
| 6 | 6.0 | 5.9 | — | — | — |
| 7 | 5.8 | 5.8 | — | — | — |
| 118 | 5.4 | 5.2 | — | — | 5.4 |
| 119 | — | 4.9 | — | — | 5.4 |
| 120 | — | 5.0 | — | — | 5.5 |
| 121 | — | 5.2 | — | — | — |
| 151 | — | 5.3 | — | — | — |
| 152 | — | 5.6 | — | — | — |

A number of the copper-base alloys with a golden visual appearance of Table 1 were DC cast, hot rolled, and further cold rolled and annealed to a thickness suitable for bonding. They were bonded as a 25%/50%/25% (by thickness) tri-clad with a C110 core. The tri-clad was cold rolled and annealed to a final thickness of about 1.65 mm (0.065 inch).

Table 3 records the compositions of these clads, along with a number of other clads and coinage materials. Table 4 records the transverse electrical conductivity as measured using an eddy current gauge with exciting current frequencies as specified.

TABLE 3

| Composition | Core | Clad | Overall Thickness (inches) | % Clad 1 | % Barrier 1 | % Core | % Barrier 2 | % |
|---|---|---|---|---|---|---|---|---|
| SBA Coin-1 | C110 | C713 | 0.065 | 25 | — | 50 | — | 25 |
| SBA Coin-2 | C110 | C713 | 0.065 | 25 | — | 50 | — | 25 |
| A | C110 | Y88 | 0.065 | 25 | — | 50 | — | 25 |
| B | C110 | Y90 | 0.065 | 25 | — | 50 | — | 25 |
| C | C110 | Y91 | 0.065 | 25 | — | 50 | — | 25 |
| D | C110 | 8% Mn 12% bal. Cu | 0.065 | 25 | — | 50 | — | 25 |
| 25 cent coin | C110 | C713 | 0.054 | 16.6 | — | 66.8 | — | 16.6 |
| 5 cent coin | C713 | None | 0.06 | — | — | 100 | — | — |
| E | C110 | 73.5% Cu 2.0% Ni 0.15% Mn bal. Zn | 0.06 | 5 | 15 | 60 | 15 | 5 |
| F | C110 | 73.5% Cu 2.0% Ni 0.15% Mn bal. Zn | 0.06 | 5 | 15 | 60 | 15 | 5 |

Notes:
• Compositional percentages are in weight percent.
• % Clad, % Barrier and % Core are in percent of overall thickness of the clad material.
• 25 cent coin and 5 cent coin refer to United States currency in the year 1999.
• Barrier for alloy B is, wt. %, 63% Cu, 12% Mn, 0.5% Ni, balance copper.
• Barrier for alloy C is, wt. %, 5% Zn, 0.3% Mn, 24% Ni, balance copper.

TABLE 4

| Composition | Frequency (kHz) | | | |
|---|---|---|---|---|
|  | 60 kHz | 120 kHz | 240 kHz | 480 kHz |
| SBA coin-1 | 49 | 27 | 13 | 6.6 |
| SBA coin-2 | 51.1 | 29.2 | 13.7 | 6.8 |

TABLE 4-continued

| Composition | Frequency (kHz) | | | |
|---|---|---|---|---|
|  | 60 kHz | 120 kHz | 240 kHz | 480 kHz |
| A | 50.2 | 28.5 | 13.5 | 6.9 |
| B | 50.9 | 29.1 | 13.8 | 7.2 |
| C | 50.4 | 29.7 | 13.8 | 7.1 |
| D | 50 | 28 | 13 | 6.9 |
| 25 cent coin | 83 | 68 | 46 | 2.5 |
| 5 cent coin | 5.2 | 5.6 | 5.5 | 5.4 |
| E | 41 | 24 | 12 | 8.2 |
| F | 43 | 25 | 14 | 9.9 |

Example 2

Copper alloys, designated 1–35, having the nominal compositions, in weight percent, designated in Table 5 were cast by direct chill casting and then hot rolled to a thickness of 12.7 mm (0.5 inch), milled to remove oxides and then cold rolled to 0.76 mm (0.03 inch) and buffed to provide a constant surface finish. Alloy designations of Table 5 are independent of the alloy designations of Tables 1–4. A similar designation does not infer a similar composition. Alloys designated 36–43 are comparison alloys. Alloy 36 is 18 carat gold and alloy 37 is 22 carat gold. Alloys 38–43 are other copper alloys as designated.

The copper alloys were then analyzed using an UltraScan XE spectrophotometer manufactured by HunterLab and the L, a* and b* values recorded (see FIG. 2). Analysis conditions were a 10° observer, a D65 illuminant and the geometry of the instrument was a d/8 sphere. Hue was calculated as:

$$hue = \arctan a^*/b^*$$

and chroma as:

$$chroma = (a^{*2} + b^{*2})^{1/2}.$$

The total color difference is calculated as:

$$\Delta E^*_{ab} = ((\Delta L^*_{ab})^2 + (\Delta a^*_{ab})^2 + (\Delta b^*_{ab})^2)^{e,fra\ 1/2}$$

The color difference as defined by the Colour Measurement Committee (CMC) of the Society of Dyers and Colourists in England is calculated as:

to the alloys as designated in Table 5. The L* axis is plotted along the right hand column. Copper alloys within the ellipsoid 36 appear to the eye to be of similar color. The

TABLE 5

Comparison to Alloy 17

| Alloy | L* | a* | b* | DE* | DEcmc | Hue | Chroma | Zn | Mn | Ni | Al | Fe | Sn |
|---|---|---|---|---|---|---|---|---|---|---|---|---|---|
| 1 | 82.72 | 6.66 | 16.64 | 3.48 | 3.4 | 68.19 | 17.92 | 6 | 5 | 4 | | | |
| 2 | 83.46 | 5.65 | 14.02 | 1.97 | 2.61 | 68.05 | 15.12 | 6 | 7 | 4 | | | |
| 3 | 82.92 | 4.95 | 13.56 | 1.53 | 1.93 | 69.95 | 14.44 | 6 | 7 | 4 | 0.3 | 1 | |
| 4 | 82.93 | 5.35 | 14.17 | 1.57 | 2.14 | 69.32 | 15.15 | 6 | 7 | 4 | 0.3 | | 0.2 |
| 5 | 83.17 | 6.04 | 14.51 | 2.21 | 2.92 | 67.40 | 15.72 | 6 | 7 | 2 | | | |
| 6 | 83.46 | 4.76 | 12.6 | 2.27 | 2.33 | 69.30 | 13.47 | 6 | 7 | 6 | | | |
| 7 | 82.57 | 4.14 | 12.09 | 2.57 | 2.13 | 71.10 | 12.78 | 6 | 9 | 4 | | | |
| 8 | 81.85 | 4.53 | 13 | 2.07 | 1.84 | 70.79 | 13.77 | 6 | 11 | 4 | | | |
| 9 | 84.43 | 5.29 | 15.16 | 2.14 | 1.87 | 70.76 | 16.06 | 9 | 5 | 4 | | | |
| 10 | 83.43 | 5.16 | 14.65 | 1.39 | 1.73 | 70.60 | 15.53 | 9 | 7 | 4 | | | |
| 11 | 83.67 | 3.54 | 12.21 | 2.52 | 1.75 | 73.83 | 12.71 | 9 | 9 | 4 | | | |
| 12 | 82.83 | 4.34 | 13.21 | 1.5 | 1.46 | 71.81 | 13.90 | 9 | 11 | 4 | | | |
| 13 | 83.32 | 2.93 | 12.13 | 2.67 | 1.87 | 76.42 | 12.48 | 11 | 10 | 4 | | | |
| 14 | 83.12 | 3.99 | 13.53 | 1.11 | 0.92 | 73.57 | 14.11 | 11 | 10 | 4 | 0.3 | 1 | |
| 15 | 84.7 | 3.82 | 15.32 | 1.88 | 0.83 | 76.00 | 15.79 | 12 | 5 | 4 | | | |
| 16 | 84.13 | 3.98 | 14.03 | 1.31 | 0.68 | 74.16 | 14.58 | 12 | 7 | 4 | | | |
| 17 | 82.96 | 3.84 | 14.61 | 0 | 0 | 75.27 | 15.11 | 12 | 7 | 4 | | | |
| 18 | 83.94 | 4.06 | 14.14 | 1.11 | 0.64 | 73.98 | 14.71 | 12 | 7 | 4 | 0.3 | 1 | |
| 19 | 84.41 | 4.42 | 15.44 | 1.77 | 0.96 | 74.03 | 16.06 | 12 | 7 | 4 | 0.3 | | 0.2 |
| 20 | 84.4 | 4.66 | 16.2 | 2.3 | 1.41 | 73.95 | 16.86 | 12 | 7 | 2 | | | |
| 21 | 82.5 | 2.95 | 12.45 | 2.38 | 1.68 | 76.67 | 12.79 | 12 | 7 | 6 | | | |
| 22 | 83.16 | 3.58 | 13.59 | 1.07 | 0.73 | 75.24 | 14.05 | 12 | 9 | 4 | | | |
| 23 | 83.89 | 2.98 | 11.83 | 3.06 | 2.06 | 75.86 | 12.20 | 12 | 11 | 4 | | | |
| 24 | 85.02 | 3.69 | 16.16 | 2.58 | 1.45 | 77.14 | 16.58 | 15 | 5 | 4 | | | |
| 25 | 83.78 | 2.56 | 13.71 | 1.77 | 1.68 | 79.42 | 13.95 | 15 | 7 | 4 | | | |
| 26 | 84.24 | 2.87 | 13.37 | 2.04 | 1.42 | 77.88 | 13.67 | 15 | 9 | 4 | | | |
| 27 | 83.6 | 2 | 11.1 | 4.02 | 3.02 | 79.79 | 11.28 | 15 | 11 | 4 | | | |
| 28 | 84.99 | 2.1 | 14.96 | 2.7 | 2.54 | 82.01 | 15.11 | 18 | 5 | 4 | | | |
| 29 | 84.26 | 1.9 | 13.71 | 2.51 | 2.56 | 82.11 | 13.84 | 18 | 7 | 4 | | | |
| 30 | 85 | 1.71 | 12.91 | 3.41 | 2.91 | 82.45 | 13.02 | 18 | 7 | 4 | 0.3 | 1 | |
| 31 | 84.85 | 1.86 | 13.81 | 2.86 | 2.67 | 82.33 | 13.93 | 18 | 7 | 4 | 0.3 | | 0.2 |
| 32 | 85.57 | 1.9 | 14.46 | 3.26 | 2.76 | 82.51 | 14.58 | 18 | 7 | 2 | | | |
| 33 | 83.87 | 2.39 | 14.01 | 1.82 | 1.9 | 80.32 | 14.21 | 18 | 7 | 6 | | | |
| 34 | 83.74 | 2.66 | 14.34 | 1.45 | 1.57 | 79.49 | 14.58 | 18 | 9 | 4 | | | |
| 35 | 83.71 | 1.87 | 11.92 | 3.42 | 2.84 | 81.08 | 12.07 | 18 | 11 | 4 | | | |
| 36 | 84.88 | 6.62 | 18.51 | 5.15 | 3.81 | 70.32 | 19.66 | | | | | | |
| 37 | 83.62 | 6.91 | 36.01 | 21.62 | 15.1 | 79.14 | 36.67 | | | | | | |
| 38 | 78.62 | 5.57 | 30.68 | 16.73 | 11.48 | 79.71 | 31.18 | 5 | | 5 | | | 2 |
| 39 | 83.38 | 4.17 | 23.15 | 8.55 | 6.18 | 79.79 | 23.52 | 25 | | 2 | | | |
| 40 | 80.94 | 1.78 | 7.17 | 7.98 | 5.41 | 76.06 | 7.39 | 1 | 1 | 25 | | | |
| 41 | 82.83 | 3.87 | 16.34 | 1.73 | 1.29 | 76.68 | 16.79 | 12 | 8 | | | | |
| 42 | 81.96 | 3.55 | 15.1 | 1.15 | 0.71 | 76.77 | 15.51 | 12 | 7 | 3.7 | | | |
| 43 | 82.52 | 4.55 | 16.81 | 2.35 | 1.62 | 74.85 | 17.41 | 12 | 7.5 | 2 | | | |

$$\Delta E_{cmc} = ((\Delta L^*/l\ SL)^2 + (\Delta C^*_{ab}/cSC)^2 + (\Delta H^*_{ab}/SH)^2)^{1/2}$$

Where:

$\Delta L^* = L^* \text{sample} - L^* \text{standard}$ $\Delta C^*_{ab} = C^*_{ab} \text{sample} - C^*_{ab} \text{standard}$ $C^*_{ab} = (a^{*2} + b^{*2})^{1/2}$ $\Delta H^*_{ab} = ((\Delta E^*_{ab})^2 - (\Delta L^*)^2 - (\Delta C^*_{ab})^2)^{1/2}$:

SL=½ length of light
SH=½ length of hue
SC=½ length of chroma
c,l=constants where l/c=2/1

Figure 6:
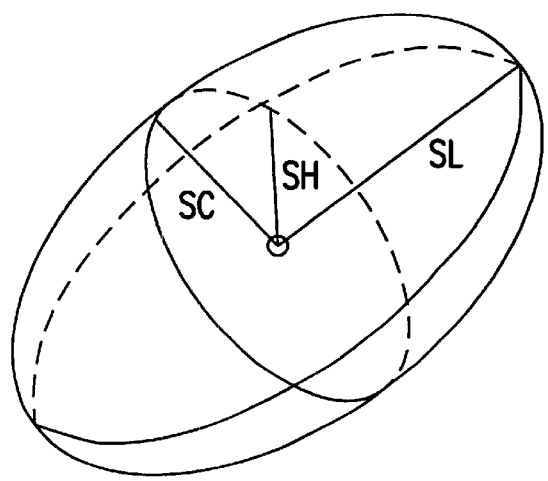
FIG. 6 graphically illustrates a Colour Measurement Committee (CMC) ellipsoid of color acceptability as known from the prior art.

In accordance with CMC standards, FIG. 6 displays a plot of the a*–b* plane in color space. The compositions that lie within the ellipsoid appear to the eye as similar (there is no perceptible difference in color).

Figure 7:
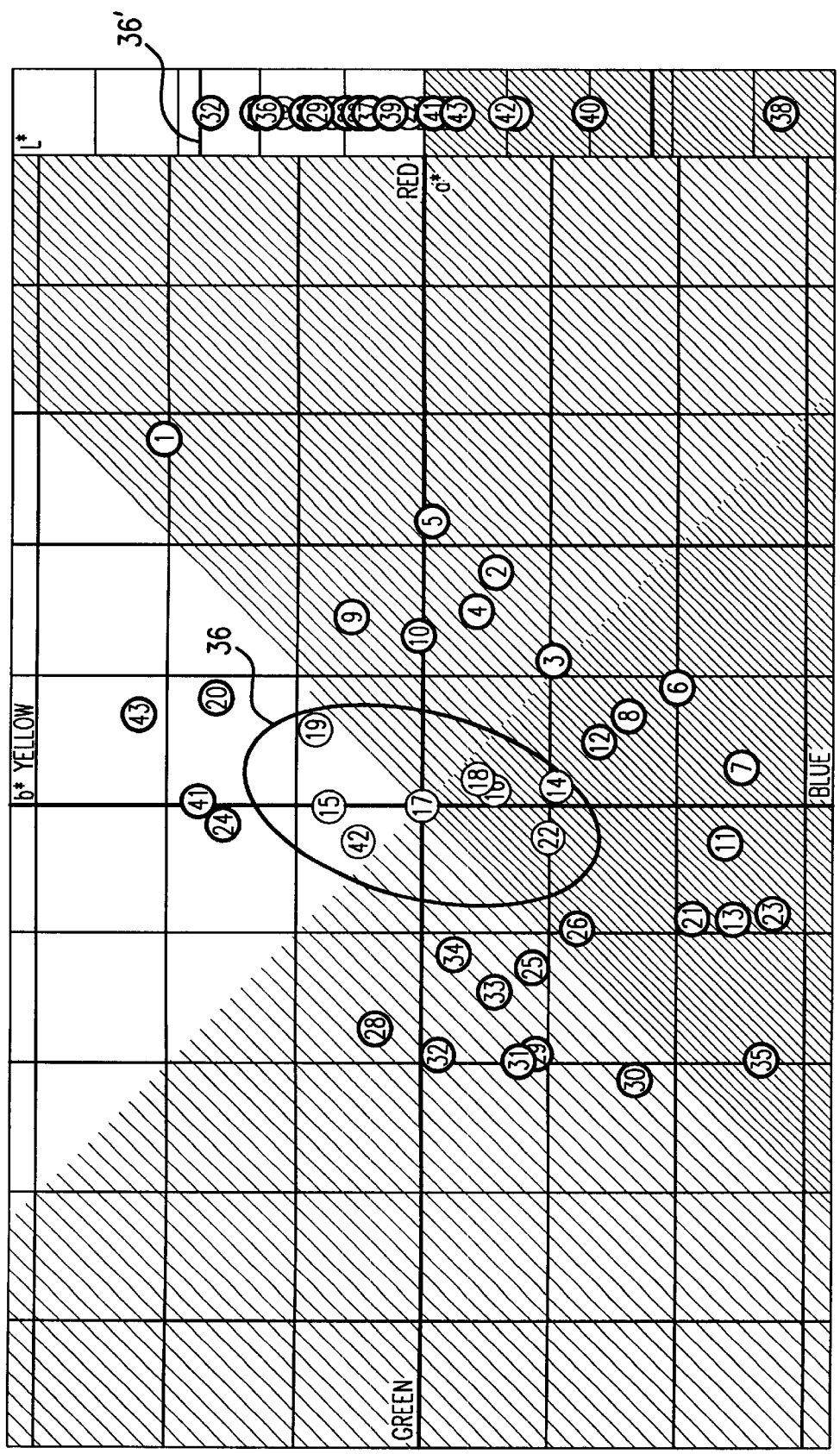
FIG. 7 graphically illustrates the alloys of the invention plotted on a first CIELAB scale with an overlying CMC ellipsoid.

FIG. 7 displays the alloys of Table 5 as a plot of the a*–b* plane in color space. The numbers in the circles corresponds horizontal bars 36' in the right hand scale correspond to where the L* axis intersects the ellipsoid. The ellipsoid represents a $\Delta E_{cmc} = 1$. This corresponds to a zinc content of 11–12%, by weight, and a manganese range of 5% to 10%, by weight and 4%, by weight, nickel. To enhance alloy recycling of brass into the alloys of the invention and to reduce cost, slight increases in zinc content, up to about 14%, by weight, may be tolerated.

Figure 8:
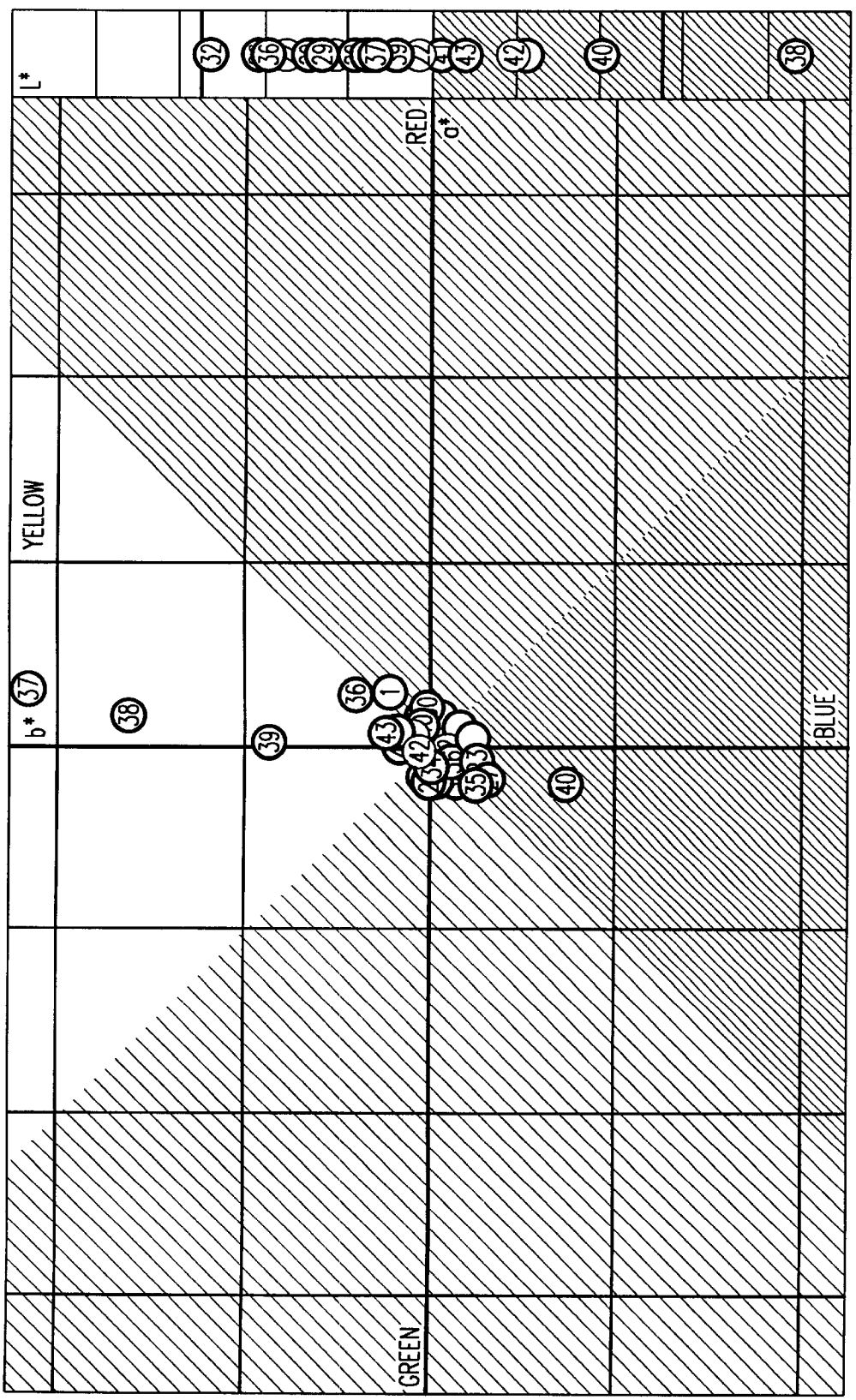
FIG. 8 graphically illustrates the alloys of the invention plotted on a second CIELAB scale.

FIG. 8 displays the alloys of Table 5 as a plot of the a*–b* plane in color space in a smaller scale than in FIG. 7 to illustrate how the alloys of the invention are distinguished from cupronickel (alloy 40).

The 1.52 mm (0.06 inch) thick copper alloys designated 1–35 in Table 5 were then subjected to a recrystallization anneal and cold rolled to a thickness of 0.76 mm (0.03 inch). The electrical conductivity was measured and is reported in Table 6. The alloy was then annealed for three hours at 550° C. and the conductivity measured again as reported in Table 7. Alloy identification corresponds to Table 5 plus 219 (Alloy 1 is Ident. 220, alloy 35 is Ident. 254, and 10 so on). The compositions reported in Table 5 were nominal targets. Actual analyzed compositions are reported in Table 9.

While primarily drawn to a copper alloy useful in the manufacture of a clad coin, the alloys of the invention are intended for any application in which a golden color and low, on the order of 5%–7% IACS, electrical conductivity is required. One such suitable application is as a monolithic, as opposed to clad, planchet. The planchets may used to form coins, tokens and casino chips.

The copper alloys of the invention are also useful for electrical connectors and for architectural or decorative purposes. Architectural applications include door knobs, handles, kick plates, fire place screens, faucet handles, shower and bath drains, meter covers and employee badge material.

When used as a connector, resistance to stress relaxation is an important consideration. Stress relaxation is a phenomenon that occurs when an external elastic stress is applied to a piece of metal. The metal reacts by developing an equal and opposite internal elastic stress. If the metal is restrained in the stressed position, the internal elastic stress decreases as a function of time. The gradual decrease in internal elastic stress is called stress relaxation and happens because of the replacement of elastic strain in the metal, by plastic or permanent strain. The rate of decrease of internal stress with time is a function of alloy composition, alloy temper, orientation relative to processing direction (e.g. longitudinal orientation=the rolling direction) and exposure temperature. It is desirable to reduce the rate of decrease, i.e. to increase the resistance to stress relaxation, as much as possible for spring and connector applications. As shown in Table 8, the percent stress remaining for the alloys of the invention is superior to conventional brass alloys.

TABLE 6

Kelvin Bridge Conductivity
Cold Rolled to 0.76 mm (0.03 inch)
Test Length 100 mm

| Ident. | Thick inches | Thick Mm | Width inches | Width mm | CSA cm$^2$ | Ratio | Bar | Resist'y | Temp. °C. | % IACS |
|---|---|---|---|---|---|---|---|---|---|---|
| 220 | 0.0298 | 0.757 | 0.7212 | 18.47 | 0.1384 | 0.40 | 4287 | 23.74 | 19.8 | 7.3 |
| 221 | 0.0300 | 0.762 | 0.7215 | 18.33 | 0.1396 | 0.40 | 5277 | 29.48 | 19.6 | 5.8 |
| 222 | 0.0301 | 0.765 | 0.7220 | 18.34 | 0.1402 | 0.40 | 6008 | 33.69 | 19.8 | 5.1 |
| 223 | 0.0298 | 0.757 | 0.7224 | 18.35 | 0.1389 | 0.40 | 5724 | 31.80 | 19.8 | 5.4 |
| 224 | 0.0286 | 0.726 | 0.7223 | 18.35 | 0.1333 | 0.40 | 5487 | 29.25 | 19.6 | 5.9 |
| 225 | 0.0300 | 0.762 | 0.7213 | 18.32 | 0.1396 | 0.40 | 5715 | 31.91 | 19.6 | 5.4 |
| 226 | 0.0295 | 0.749 | 0.7222 | 18.34 | 0.1375 | 0.40 | 6737 | 37.04 | 19.5 | 4.6 |
| 227 | 0.0300 | 0.762 | 0.7217 | 18.33 | 0.1397 | 0.40 | 7820 | 43.69 | 19.2 | 3.9 |
| 228 | 0.0301 | 0.765 | 0.7204 | 18.30 | 0.1399 | 0.40 | 4285 | 23.98 | 19.2 | 7.2 |
| 229 | 0.0301 | 0.765 | 0.7213 | 18.32 | 0.1401 | 0.40 | 5509 | 30.87 | 19.2 | 5.6 |
| 230 | 0.0283 | 0.719 | 0.7190 | 18.26 | 0.1313 | 0.40 | 7175 | 37.68 | 19.2 | 4.6 |
| 231 | 0.0294 | 0.747 | 0.7193 | 18.27 | 0.1364 | 0.40 | 8246 | 45.00 | 20.6 | 3.8 |
| 232 | 0.0293 | 0.744 | 0.7198 | 18.28 | 0.1361 | 0.40 | 7710 | 41.96 | 20.5 | 4.1 |
| 233 | 0.0303 | 0.770 | 0.7203 | 18.30 | 0.1408 | 0.40 | 7785 | 43.85 | 20.3 | 3.9 |
| 234 | 0.0301 | 0.765 | 0.7188 | 18.26 | 0.1396 | 0.40 | 4310 | 24.06 | 19.8 | 7.2 |
| 235 | 0.0296 | 0.752 | 0.7197 | 18.28 | 0.1374 | 0.40 | 5367 | 29.51 | 19.6 | 5.8 |
| 236 | 0.0296 | 0.752 | 0.7212 | 18.32 | 0.1377 | 0.40 | 5244 | 28.89 | 19.6 | 6.0 |
| 237 | 0.0282 | 0.716 | 0.7200 | 18.29 | 0.1310 | 0.40 | 6091 | 31.92 | 19.6 | 5.4 |
| 238 | 0.0304 | 0.772 | 0.7207 | 18.31 | 0.1413 | 0.40 | 5197 | 29.38 | 19.6 | 5.9 |
| 239 | 0.0298 | 0.757 | 0.7208 | 18.31 | 0.1386 | 0.40 | 5487 | 30.42 | 19.4 | 5.7 |
| 240 | 0.0296 | 0.752 | 0.7180 | 18.24 | 0.1371 | 0.40 | 6216 | 34.09 | 19.2 | 5.0 |
| 241 | 0.0308 | 0.782 | 0.7193 | 18.27 | 0.1429 | 0.40 | 6835 | 39.08 | 19.0 | 4.4 |
| 242 | 0.0308 | 0.782 | 0.7190 | 18.26 | 0.1429 | 0.40 | 8030 | 45.89 | 19.0 | 3.7 |
| 243 | 0.0297 | 0.754 | 0.7192 | 18.27 | 0.1378 | 0.40 | 4794 | 26.43 | 19.0 | 6.5 |
| 244 | 0.0305 | 0.777 | 0.7185 | 18.25 | 0.1414 | 0.40 | 5827 | 32.95 | 19.0 | 5.2 |
| 245 | 0.0303 | 0.770 | 0.7180 | 18.24 | 0.1404 | 0.40 | 7141 | 40.09 | 19.0 | 4.3 |
| 246 | 0.0300 | 0.762 | 0.7200 | 18.29 | 0.1394 | 0.40 | 8329 | 46.43 | 19.0 | 3.7 |
| 247 | 0.0290 | 0.737 | 0.7197 | 18.28 | 0.1347 | 0.40 | 4951 | 26.67 | 19.0 | 6.4 |
| 248 | 0.0309 | 0.785 | 0.7177 | 18.23 | 0.1431 | 0.40 | 5801 | 33.20 | 19.0 | 5.2 |
| 249 | 0.0304 | 0.772 | 0.7195 | 18.28 | 0.1411 | 0.40 | 6255 | 35.31 | 19.0 | 4.9 |
| 250 | 0.0304 | 0.772 | 0.7186 | 18.25 | 0.1409 | 0.40 | 6124 | 34.52 | 19.0 | 5.0 |
| 251 | 0.0295 | 0.749 | 0.7175 | 18.22 | 0.1366 | 0.40 | 5990 | 32.72 | 19.0 | 5.2 |
| 252 | 0.0304 | 0.772 | 0.7176 | 18.23 | 0.1407 | 0.40 | 6355 | 35.78 | 19.0 | 4.8 |
| 253 | 0.0303 | 0.770 | 0.7180 | 18.24 | 0.1404 | 0.40 | 7300 | 40.98 | 19.0 | 4.2 |
| 254 | 0.0302 | 0.767 | 0.7178 | 18.23 | 0.1399 | 0.40 | 8581 | 48.00 | 19.0 | 3.6 |

TABLE 7

Kelvin Bridge Conductivity
Cold Rolled to 0.76 mm (0.03 inch)
Annealed 550° C. for 3 hours
Test Length 100 mm

| Ident. | Thick inches | Thick Mm | Width inches | Width mm | CSA Cm$^2$ | Ratio | Bar | Resist'y | Temp. °C. | % IACS |
|---|---|---|---|---|---|---|---|---|---|---|
| J220 | 0.0305 | 0.777 | 0.7530 | 19.13 | 0.1482 | 0.80 | 1942 | 23.02 | 18.4 | 7.4 |
| J221 | 0.0303 | 0.770 | 0.7529 | 19.12 | 0.1472 | 0.80 | 2443 | 28.76 | 18.4 | 6.0 |
| J222 | 0.0309 | 0.785 | 0.7520 | 19.10 | 0.1499 | 0.80 | 2697 | 32.35 | 18.4 | 5.3 |

TABLE 7-continued

Kelvin Bridge Conductivity
Cold Rolled to 0.76 mm (0.03 inch)
Annealed 550° C. for 3 hours
Test Length 100 mm

| Ident. | Thick inches | Thick Mm | Width inches | Width mm | CSA Cm² | Ratio | Bar | Resist'y | Temp. ° C. | % IACS |
|---|---|---|---|---|---|---|---|---|---|---|
| J223 | 0.0298 | 0.757 | 0.7676 | 19.50 | 0.1476 | 0.80 | 2629 | 31.04 | 18.4 | 5.5 |
| J224 | 0.0296 | 0.752 | 0.7520 | 19.10 | 0.1436 | 0.80 | 2482 | 28.51 | 18.4 | 6.0 |
| J225 | 0.0304 | 0.772 | 0.7527 | 19.12 | 0.1476 | 0.80 | 2638 | 31.15 | 18.4 | 5.5 |
| J226 | 0.0300 | 0.762 | 0.7529 | 19.12 | 0.1457 | 0.80 | 3100 | 36.14 | 18.4 | 4.7 |
| J227 | 0.0304 | 0.772 | 0.7513 | 19.08 | 0.1474 | 0.80 | 3604 | 42.48 | 18.4 | 4.0 |
| J228 | 0.0309 | 0.785 | 0.7513 | 19.08 | 0.1498 | 0.80 | 1939 | 23.23 | 18.5 | 7.4 |
| J229 | 0.0305 | 0.777 | 0.7514 | 19.09 | 0.1479 | 0.80 | 2541 | 30.06 | 18.5 | 5.7 |
| J230 | 0.0289 | 0.734 | 0.7525 | 19.11 | 0.1403 | 0.80 | 3278 | 36.79 | 18.7 | 4.7 |
| J231 | 0.0299 | 0.759 | 0.7518 | 19.10 | 0.1450 | 0.80 | 3713 | 43.08 | 18.4 | 4.0 |
| J232 | 0.0304 | 0.772 | 0.7521 | 19.10 | 0.1475 | 0.80 | 3444 | 40.64 | 18.4 | 4.2 |
| J233 | 0.0307 | 0.780 | 0.7526 | 19.12 | 0.1491 | 0.80 | 3521 | 41.99 | 18.6 | 4.1 |
| J234 | 0.0304 | 0.772 | 0.7530 | 19.13 | 0.1477 | 0.80 | 1969 | 23.26 | 18.4 | 7.4 |
| J235 | 0.0298 | 0.757 | 0.7519 | 19.10 | 0.1446 | 0.80 | 2452 | 28.36 | 18.7 | 6.0 |
| J236 | 0.0300 | 0.762 | 0.7634 | 19.39 | 0.1478 | 0.80 | 2387 | 28.22 | 18.8 | 6.1 |
| J237 | 0.0288 | 0.732 | 0.7536 | 19.14 | 0.1400 | 0.80 | 2700 | 30.25 | 18.5 | 5.7 |
| J238 | 0.0310 | 0.787 | 0.7535 | 19.14 | 0.1506 | 0.80 | 2360 | 28.45 | 18.6 | 6.0 |
| J239 | 0.0304 | 0.772 | 0.7508 | 19.07 | 0.1473 | 0.80 | 2503 | 29.49 | 18.6 | 5.8 |
| J240 | 0.0298 | 0.757 | 0.7533 | 19.13 | 0.1448 | 0.80 | 2817 | 32.64 | 18.6 | 5.3 |
| J241 | 0.0308 | 0.782 | 0.7521 | 19.10 | 0.1494 | 0.80 | 3116 | 37.25 | 18.6 | 4.6 |
| J242 | 0.0313 | 0.795 | 0.7521 | 19.10 | 0.1519 | 0.80 | 3653 | 44.38 | 18.8 | 3.9 |
| J243 | 0.0308 | 0.782 | 0.7544 | 19.16 | 0.1499 | 0.80 | 2095 | 25.12 | 18.6 | 6.8 |
| J244 | 0.0309 | 0.785 | 0.7528 | 19.12 | 0.1501 | 0.80 | 2633 | 31.61 | 18.7 | 5.4 |
| J245 | 0.0307 | 0.780 | 0.7550 | 19.18 | 0.1495 | 0.80 | 3216 | 38.47 | 18.6 | 4.5 |
| J246 | 0.0307 | 0.780 | 0.7534 | 19.14 | 0.1492 | 0.80 | 3749 | 44.75 | 18.8 | 3.8 |
| J247 | 0.0299 | 0.759 | 0.7533 | 19.13 | 0.1453 | 0.80 | 2192 | 25.48 | 19.3 | 6.7 |
| J248 | 0.0314 | 0.798 | 0.7535 | 19.14 | 0.1526 | 0.80 | 2616 | 31.95 | 19.1 | 5.4 |
| J249 | 0.0307 | 0.780 | 0.7510 | 19.08 | 0.1487 | 0.80 | 2783 | 33.12 | 19.0 | 5.2 |
| J250 | 0.0306 | 0.777 | 0.7521 | 19.10 | 0.1485 | 0.80 | 2732 | 32.45 | 18.7 | 5.3 |
| J251 | 0.0306 | 0.777 | 0.7517 | 19.09 | 0.1484 | 0.80 | 2640 | 31.34 | 18.7 | 5.5 |
| J252 | 0.0306 | 0.777 | 0.7511 | 19.08 | 0.1483 | 0.80 | 2882 | 34.19 | 18.7 | 5.0 |
| J253 | 0.0307 | 0.780 | 0.7530 | 19.13 | 0.1491 | 0.80 | 3288 | 39.23 | 18.7 | 4.4 |
| J254 | 0.0306 | 0.777 | 0.7530 | 19.13 | 0.1487 | 0.80 | 3865 | 45.96 | 18.7 | 3.7 |

TABLE 8

Stress Relaxation Resistance

| ALLOY | | | | CONDITION** or TEMPER | 0.2% YS MPa (ksi) | % STRESS REMAINING (after 1000 hrs) | | |
|---|---|---|---|---|---|---|---|---|
| | | | | | | 105° C. | 125° C. | 150° C. |
| COMPARISON ALLOYS | | | | | | | | |
| Cu—10% Zn | | | | 60% RR | 469 (68) | 68§ | — | — |
| | | | | 60% RR + RA | 469 (68) | 71§ | — | — |
| Cu—10% Zn—1% Mn | | | | 60% RR | 490 (71) | 77§ | — | — |
| COMMERCIAL ALLOYS | | | | | | | | |
| C260 (30% Zn—Cu) | | | | Spring | 662 (96) | 55 | — | 36 |
| C425 (9.5% Zn—1.8% Sn—Cu) | | | | ExHard/RA | 517 (75) | 95 | 81 | 62 |
| C663 (10.5% Zn—1.8% Sn—1.7% Fe—0.03% P—Cu) | | | | Spring/RA | 655 (95) | 92 | 81 | 59 |
| INVENTIVE ALLOY (Mn—Zn—Ni—Cu) | | | | | | | | |
| Lab I.D. | % Mn | % Zn | % Ni | | | | | |
| J234 | 5 | 12 | 4 | 50% RR + RA | 614 (89) | — | 94 | 79 |
| J235 | 7 | 12 | 4 | | 655 (95) | — | 95 | 86 |
| J241 | 9 | 12 | 4 | | 731 (106) | — | — | 87 |
| J240 | 7 | 12 | 6 | | 724 (105) | — | 95 | 86 |
| J239 | 7 | 12 | 2 | | 648 (94) | — | 93 | 82 |
| J229 | 7 | 9 | 4 | | 655 (95) | — | 96 | — |
| J244 | 7 | 15 | 4 | | 710 (103) | — | 94 | 80 |

**RR (rolling reduction),
RA (relief anneal, within 200° C.–300° C. for 1–3 hrs)
§Estimated from $10^5$ hour data.

TABLE 9

Analyzed Compositions

| Sample D | Zn | Mn | Ni | Al | Sn | Fe |
|---|---|---|---|---|---|---|
| J220 Analyzed* | 6.53 | 5.30 | 3.63 | | | |
| Analyzed** | 6.12 | 4.77 | 3.84 | | | |
| Target | 6.0 | 5.0 | 4.0 | | | |
| J221 Analyzed* | 5.93 | 7.01 | 4.01 | | | |
| Analyzed** | 5.92 | 6.84 | 3.97 | | | |
| Target | 6.0 | 7.0 | 4.0 | | | |
| J222 Analyzed* | 5.80 | 6.94 | 4.09 | 0.31 | | 1.08 |
| Analyzed** | 6.08 | 7.18 | 3.88 | 0.31 | | 1.04 |
| Target | 6.0 | 7.0 | 4.0 | 0.3 | | 1.0 |
| J223 Analyzed* | 5.81 | 7.22 | 4.06 | 0.3 | 0.19 | |
| Analyzed** | 5.97 | 7.19 | 4.03 | 0.31 | 0.20 | |
| Target | 6.0 | 7.0 | 4.0 | 0.3 | 0.2 | |
| J224 Analyzed* | 5.89 | 7.44 | 1.99 | | | |
| Analyzed** | 6.02 | 7.14 | 2.00 | | | |
| Target | 6.0 | 7.0 | 2.0 | | | |
| J225 Analyzed* | 5.82 | 7.05 | >5.3 | | | |
| Analyzed** | 6.03 | 7.20 | 6.03 | | | |
| Target | 6.0 | 7.0 | 6.0 | | | |
| J226 Analyzed* | 5.82 | 8.54 | 3.79 | | | |
| Analyzed** | 6.03 | 9.05 | 4.03 | | | |
| Target | 6.0 | 9.0 | 4.0 | | | |
| J227 Analyzed* | 5.69 | 11.16 | 3.99 | | | |
| Analyzed** | 6.06 | 10.95 | 3.99 | | | |
| Target | 6.0 | 11.0 | 4.0 | | | |
| J228 Analyzed* | 9.02 | 4.99 | 3.67 | | | |
| Analyzed** | 9.02 | 4.65 | 4.03 | | | |
| Target | 9.0 | 5.0 | 4.0 | | | |
| J229 Analyzed* | 9.62 | 6.81 | 3.82 | | | |
| Analyzed** | 9.04 | 7.10 | 4.03 | | | |
| Target | 9.0 | 7.0 | 4.0 | | | |
| J230 Analyzed* | 9.38 | 9.65 | 3.79 | | | |
| Analyzed** | 9.10 | 8.97 | 4.02 | | | |
| Target | 9.0 | 9.0 | 4.0 | | | |
| J231 Analyzed* | 9.75 | 10.85 | 3.39 | | | |
| Analyzed** | 9.16 | 10.87 | 4.08 | | | |
| Target | 9.0 | 11.0 | 4.0 | | | |
| J232 Analyzed* | 11.10 | 10.12 | 3.92 | | | |
| Analyzed** | 11.15 | 10.10 | 4.07 | | | |
| Target | 11.0 | 10.0 | 4.0 | | | |
| J233 Analyzed* | 10.77 | 9.79 | 4.05 | 0.30 | | 1.05 |
| Analyzed** | 11.10 | 9.87 | 3.96 | 0.29 | | 1.05 |
| Target | 11.0 | 10.0 | 4.0 | 0.3 | | 1.0 |
| J234 Analyzed* | 12.15 | 4.74 | 3.71 | | | |
| Analyzed** | 12.14 | 4.33 | 4.00 | | | |
| Target | 12.0 | 5.0 | 4.0 | | | |
| J235 Analyzed* | 11.17 | 6.36 | 3.67 | | | |
| Analyzed** | 10.98 | 6.28 | 3.59 | | | |
| Target | 12.0 | 7.0 | 4.0 | | | |
| J236 Analyzed* | 11.07 | 6.32 | 3.65 | | | |
| Analyzed** | 10.99 | 6.24 | 3.59 | | | |
| Target | 12.0 | 7.0 | 4.0 | | | |
| J237 Analyzed* | 11.01 | 6.17 | 3.68 | 0.27 | | 1.03 |
| Analyzed** | 10.97 | 6.35 | 3.61 | 0.27 | | 0.91 |
| Target | 12.0 | 7.0 | 4.0 | 0.3 | | 1.0 |
| J238 Analyzed* | 11.24 | 6.17 | 3.63 | 0.26 | 0.2 | |
| Analyzed** | 11.36 | 6.16 | 3.58 | 0.30 | 0.18 | |
| Target | 12.0 | 7.0 | 4.0 | 0.3 | 0.2 | |
| J239 Analyzed* | 12.28 | 7.02 | 1.97 | | | |
| Analyzed** | 12.02 | 6.94 | 1.88 | | | |
| Target | 12.0 | 7.0 | 2.0 | | | |
| J240 Analyzed* | 12.01 | 6.72 | >5.29 | | | |
| Analyzed** | 12.03 | 6.98 | 5.97 | | | |
| Target | 12.0 | 7.0 | 6.0 | | | |
| J241 Analyzed* | 11.92 | 9.46 | 3.86 | | | |
| Analyzed** | 12.08 | 8.82 | 4.00 | | | |
| Target | 12.0 | 9.0 | 4.0 | | | |
| J242 Analyzed* | 12.15 | 10.79 | 3.92 | | | |
| Analyzed** | 12.22 | 11.07 | 3.90 | | | |
| Target | 12.0 | 11.0 | 4.0 | | | |
| J243 Analyzed* | 14.64 | 4.93 | 3.84 | | | |
| Analyzed** | 15.22 | 4.83 | 4.09 | | | |
| Target | 15.0 | 5.0 | 4.0 | | | |
| J244 Analyzed* | 15.07 | 6.61 | 3.78 | | | |
| Analyzed** | 15.17 | 6.98 | 3.98 | | | |
| Target | 15.0 | 7.0 | 4.0 | | | |
| J245 Analyzed* | 15.03 | 9.49 | 3.95 | | | |
| Analyzed** | 15.03 | 8.73 | 4.00 | | | |
| Target | 15.0 | 9.0 | 4.0 | | | |
| J246 Analyzed* | 14.97 | 10.66 | 3.99 | | | |
| Analyzed** | 14.99 | 10.76 | 4.09 | | | |
| Target | 15.0 | 11.0 | 4.0 | | | |
| J247 Analyzed* | 17.52 | 4.78 | 3.93 | | | |
| Analyzed** | 17.95 | 4.73 | 4.02 | | | |
| Target | 18.0 | 5.0 | 4.0 | | | |
| J248 Analyzed* | 17.25 | 6.39 | 3.53 | | | |
| Analyzed** | 18.28 | 6.75 | 3.83 | | | |
| Target | 18.0 | 7.0 | 4.0 | | | |
| J249 Analyzed* | 17.25 | 6.30 | 3.56 | 0.29 | | 1.02 |
| Analyzed** | 17.94 | 6.82 | 3.99 | 0.28 | | 1.03 |
| Target | 18.0 | 7.0 | 4.0 | 0.3 | | 1.0 |
| J250 Analyzed* | 17.38 | 6.65 | 3.60 | | | |
| Analyzed** | 18.45 | 6.75 | 3.92 | 0.31 | 0.2 | |
| Target | 18.0 | 7.0 | 4.0 | | | |
| J251 Analyzed* | 17.64 | 6.83 | 2.0 | | | |
| Analyzed** | 18.28 | 7.03 | 1.95 | | | |
| Target | 18.0 | 7.0 | 2.0 | | | |
| J252 Analyzed* | 17.40 | 6.48 | >5.29 | | | |
| Analyzed** | 18.16 | 6.86 | 6.04 | | | |
| Target | 18.0 | 7.0 | 6.0 | | | |
| J253 Analyzed* | 17.76 | 9.29 | 3.69 | | | |
| Analyzed** | 18.22 | 8.69 | 3.99 | | | |
| Target | 18.0 | 9.0 | 4.0 | | | |
| J254 Analyzed* | 17.64 | 10.53 | 4.02 | | | |
| Analyzed** | 18.23 | 11.01 | 3.95 | | | |
| Target | 18.0 | 11.0 | 4.0 | | | |

*Spark Method
**ICP Method

Short range ordering is a phenomenon by which the atoms of the solvent (copper) and solute in a solid solution occupy preferred sites in a crystalline array. When ordering occurs, regions of the alloy may be ordered and other regions disordered. The ordered portions are typically characterized by a higher strength than the disordered portions. This leads to discontinuities in the alloy strength from an ordered portion to a disordered portion and makes it difficult to predict alloy properties. One way that ordering is manifest in Cu—Zn brass and Cu—Zn—Ni nickel silver is by an increase in strength during relief annealing of a cold worked alloy. Table 10 records the yield strength (YS) and ultimate tensile 10 strength (UTS) increase of the Table 5 alloys that were initially in the 50% cold rolled condition and then relief annealed at 300° C. for 2 hours. An increase in strength of greater than 27.6 MPa (4 ksi) is indicative of short range ordering. To reduce instability due to short range ordering, such as for connector applications, the alloy composition, by weight should be as follows:

Maxima: Zn<15% Mn<9% Ni<6
RangesZn 6%–12% Mn 5%–7% Ni 2%–<6%
Combination (Zn+Mn)<21% and Ni 2%–4%

TABLE 10

Strength Change with Relief Annealing

| Alloy | Weight Percent (Zn + Mn) | Change YS (RA-CR) MPA (ksi) | Change UTS (RA-CR) MPA (ksi) | Conductivity ○ = 5%–7% LACS X not = 5%–7% LACS |
|---|---|---|---|---|
| J220 | 11 | −6.9 (−1) | 0 (0) | X |
| J221 | 13 | 6.9 (1) | 20.7 (3) | ○ |

TABLE 10-continued

Strength Change with Relief Annealing

| Alloy | Weight Percent (Zn + Mn) | Change YS (RA-CR) MPA (ksi) | Change UTS (RA-CR) MPA (ksi) | Conductivity ○ = 5%–7% LACS X not = 5%–7% LACS |
|---|---|---|---|---|
| J224 | 13 | −13.8 (−2) | −6.9 (−1) | ○ |
| J225 | 13 | 13.8 (2) | 13.8 (2) | ○ |
| J226 | 15 | 27.6 (4) | 27.6 (4) | X |
| J227 | 17 | 13.8 (2) | 13.8 (2) | X |
| J228 | 14 | 20.7 (3) | 20.7 (3) | X |
| J229 | 16 | 0 (0) | 6.9 (1) | ○ |
| J230 | 18 | 13.8 (2) | 20.7 (3) | X |
| J231 | 20 | 55.2 (8) | 55.2 (8) | X |
| J232 | 21 | 20.7 (3) | 20.7 (3) | X |
| J234 | 17 | 13.8 (2) | 27.6 (4) | X |
| J235 | 19 | 13.8 (2) | 34.5 (5) | ○ |
| J236 | 19 | 13.8 (2) | 13.8 (2) | ○ |
| J239 | 19 | −6.9 (−1) | 6.9 (1) | ○ |
| J240 | 19 | 13.8 (2) | 20.7 (3) | ○ |
| J241 | 21 | 0 (0) | 13.8 (2) | X |
| J242 | 23 | 20.7 (3) | 20.7 (3) | X |
| J243 | 20 | 41.4 (6) | 55.2 (8) | ○ |
| J244 | 22 | 41.4 (6) | 41.4 (6) | ○ |
| J245 | 24 | 75.8 (11) | 89.6 (13) | X |
| J246 | 26 | 55.2 (8) | 48.3 (7) | X |
| J247 | 23 | 6.9 (1) | 41.4 (6) | ○ |
| J248 | 25 | 34.5 (5) | 34.5 (5) | ○ |
| J251 | 25 | 0 (0) | 6.9 (1) | ○ |
| J252 | 25 | 55.2 (8) | 55.2 (8) | X |
| J253 | 27 | 48.3 (7) | 62.1 (9) | X |
| J254 | 29 | 48.3 (7) | 34.5 (5) | X |

It is apparent that there has been provided in accordance with this invention a metallic composite suitable for coinage that fully satisfies the objects, features and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A copper alloy resistant to short range ordering and having a golden visual appearance consisting essentially, by weight, of:
   from 5% to 10% of manganese;
   from 10% to 14% of zinc;
   from 3.5% to 4.5% of nickel;
   less than 0.07% aluminum; and
   the balance copper and inevitable impurities, said copper alloy having an electrical conductivity in excess of 4% IACS at eddy current gauge exciting frequencies of between 60 kHz and 480 kHz.

2. The copper all alloy of claim 1 having a chromium content of less than 0.3% by weight.

3. The copper alloy of claim 2 wherein said electrical conductivity is between 5% IACS and 7% IACS.

4. The cooper alloy of claim 3 wherein said manganese content is from 6.0% to 7.0% and said zinc content is from 11% to 12%.

5. The copper alloy of claim 3 having attributes of lightness, chroma and hue commensurate with a golden visual appearance.

6. The copper alloy of claim 5 wherein said manganese content is from 6.0% to 7.0% and said zinc content is from 11% to 12%.

7. A planchet formed from the copper alloy of claim 1.

8. An electrical connector formed from the copper alloy of claim 1 having an internal elastic stress and a resistance to stress relaxation.

9. The connector of claim 8 having a less than 27.6 MPa (4 ksi) increase in strength when the alloy is relief annealed from a 50% cold rolled condition.

10. The connector of claim 8 having more than 90% stress remaining following exposure to 125° C. for 1000 hours.

11. The copper alloy of claim 1 wherein said short range ordering is manifest by an increase in strength in excess of 27.6 MPa following relief annealing of said copper alloy in a 50% cold rolled condition.

12. A clad material, comprising:
   a core having a first thickness defined by first and second opposing surfaces, said core formed from a material selected from the group consisting of copper and copper alloys having an electrical conductivity in excess of 90% IACS;
   a first cladding layer having a second thickness and bonded to said first opposing surface; and
   a second cladding layer having a third thickness and bonded to said second opposing surface, wherein said first cladding layer and said second cladding layer are copper base alloys each consisting essentially, by weight, of from 5% to 10% of manganese, from 10% to 14% of zinc, from 2% to 6% of nickel, with the balance copper and inevitable impurities, said first cladding layer and said second cladding layer each having an electrical conductivity of at least 4% IACS at eddy current gauge exciting frequencies of between 60 kHz and 480 kHz, said first thickness, said second thickness and said third thickness individually selected such that said clad material has a transverse electrical conductivity within about 2% IACS of a Susan B. Anthony United States dollar at eddy current gauge exciting frequencies of between 60 kHz and 480 kHz.

13. The clad material of claim 12 wherein said core has an electrical conductivity in excess of 99% IACS.

14. The clad material of claim 13 wherein said core is copper alloy C110.

15. The clad material of claim 14 wherein said first cladding layer and said second cladding layer each have a chromium content of less than 0.3%, by weight.

16. The clad material of claim 15 wherein said first cladding layer and said second cladding layer each have an electrical coductivity is between 5% IACS and 7% IACS.

17. The clad material of claim 16 wherein said first cladding layer and said second cladding layer each with said manganese content between 6.0% to 7.0% said zinc content between 11% to 12% and said nickel content between 3.5% to 4.5%.

18. The clad material of claim 17 wherein said first cladding layer and said second cladding layer each have an aluminum content of less than 0.07%.

19. The clad material of claim 16 wherein said first cladding layer and said second cladding layer each have attributes of lightness, chroma and hue commensurate with a gold visual appearance.

20. The clad material of claim 19 wherein said first cladding layer and said second cladding layer each said manganese content between 6.0% to 7.0%, said zinc content between 11% to 12% and said nickel content between 3.5% to 4.5%.

21. The clad material of claim 19 wherein said first cladding layer and said second cladding layer each have a thickness of from 20%–30%, by thickness, of the overall thickness and said core has a thickness from about 40% to about 60% by thickness, of said overall thickness.

22. The clad material of claim 21 wherein said first cladding layer and said second cladding layer each have a thickness of about 25%, by thickness, of said overall thickness and said core has a thickness of about 50%, by thickness, of said overall thickness.

23. A planchet formed from the clad material of claim 21.

* * * * *